Patented Jan. 13, 1925.

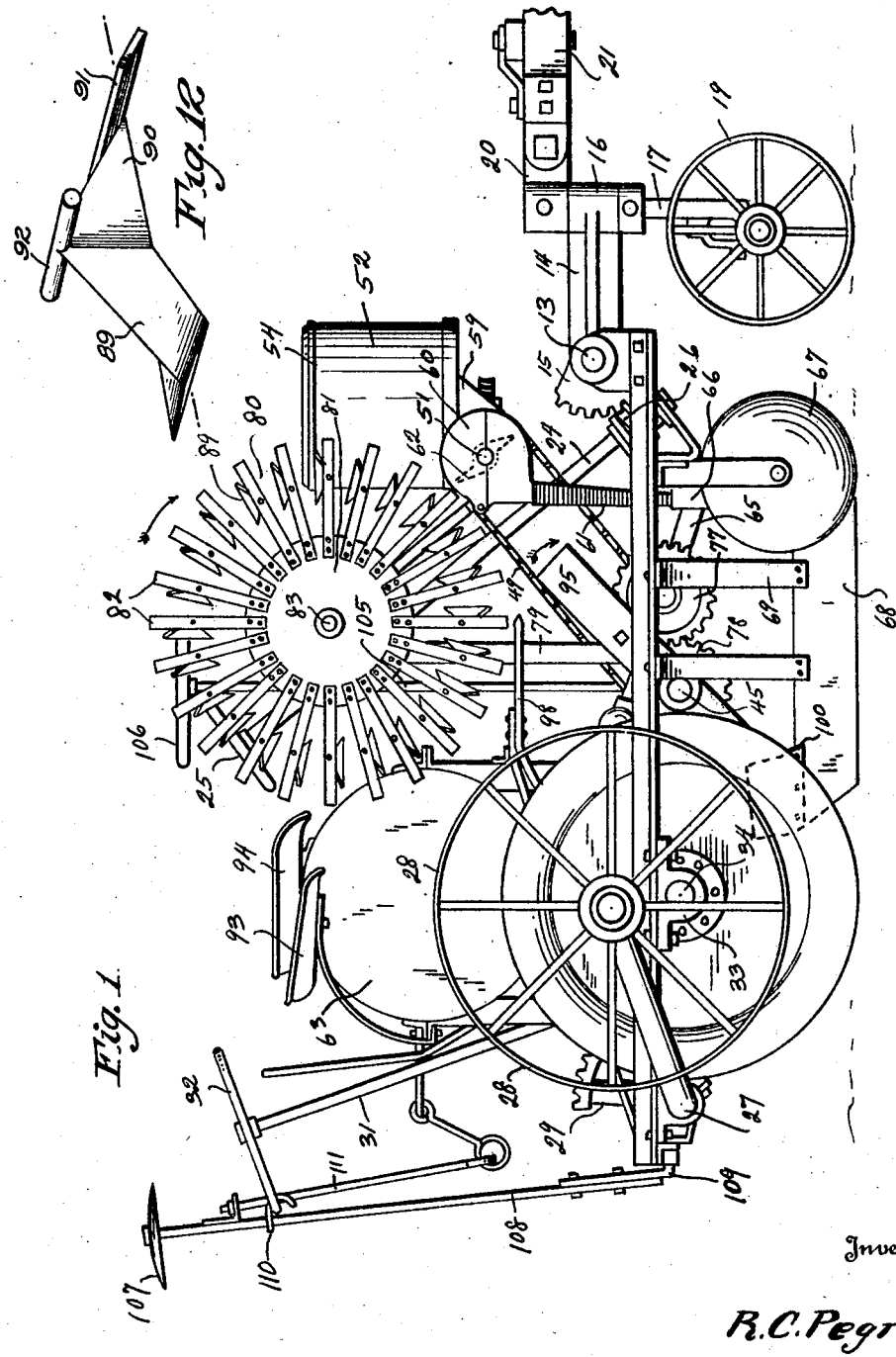

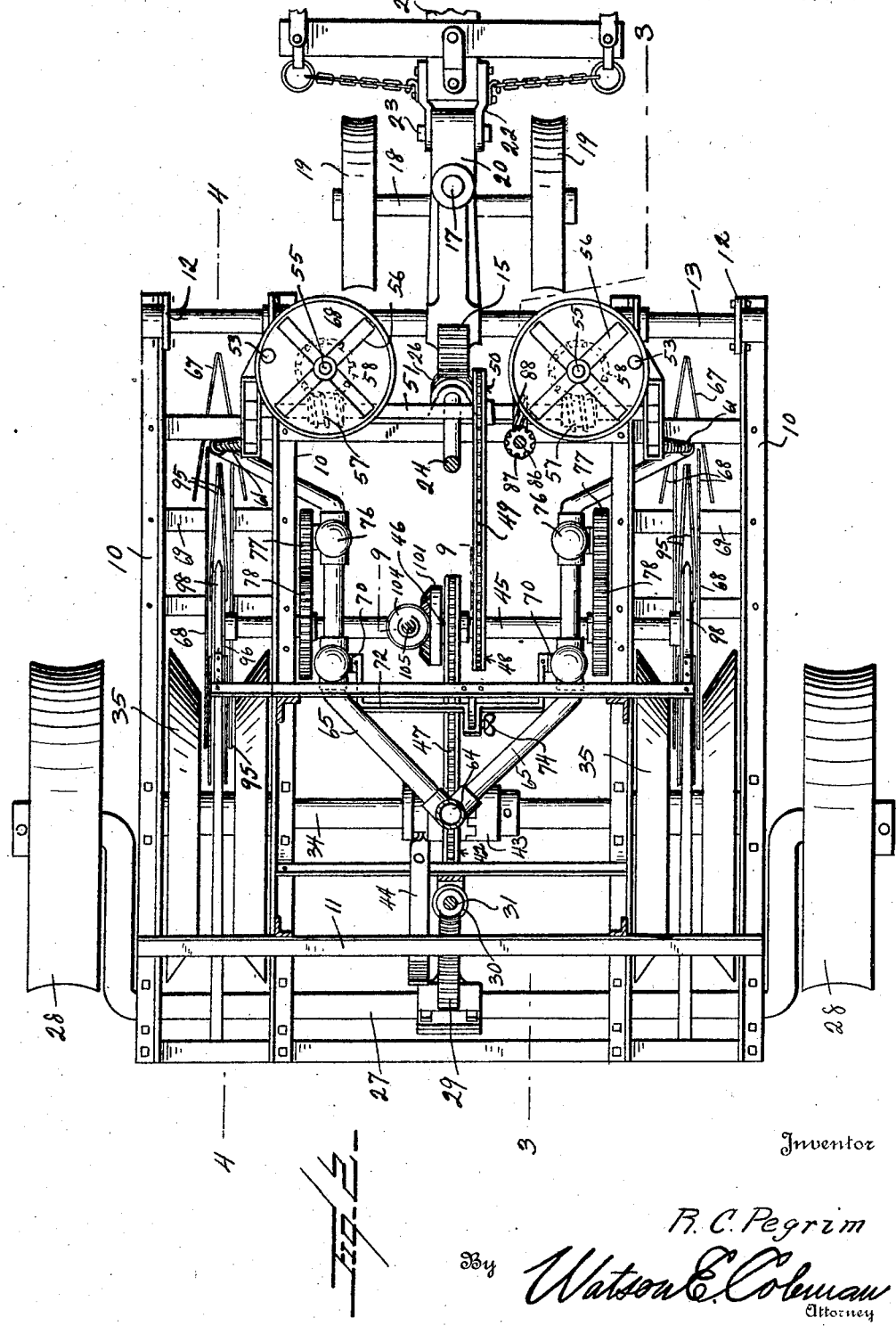

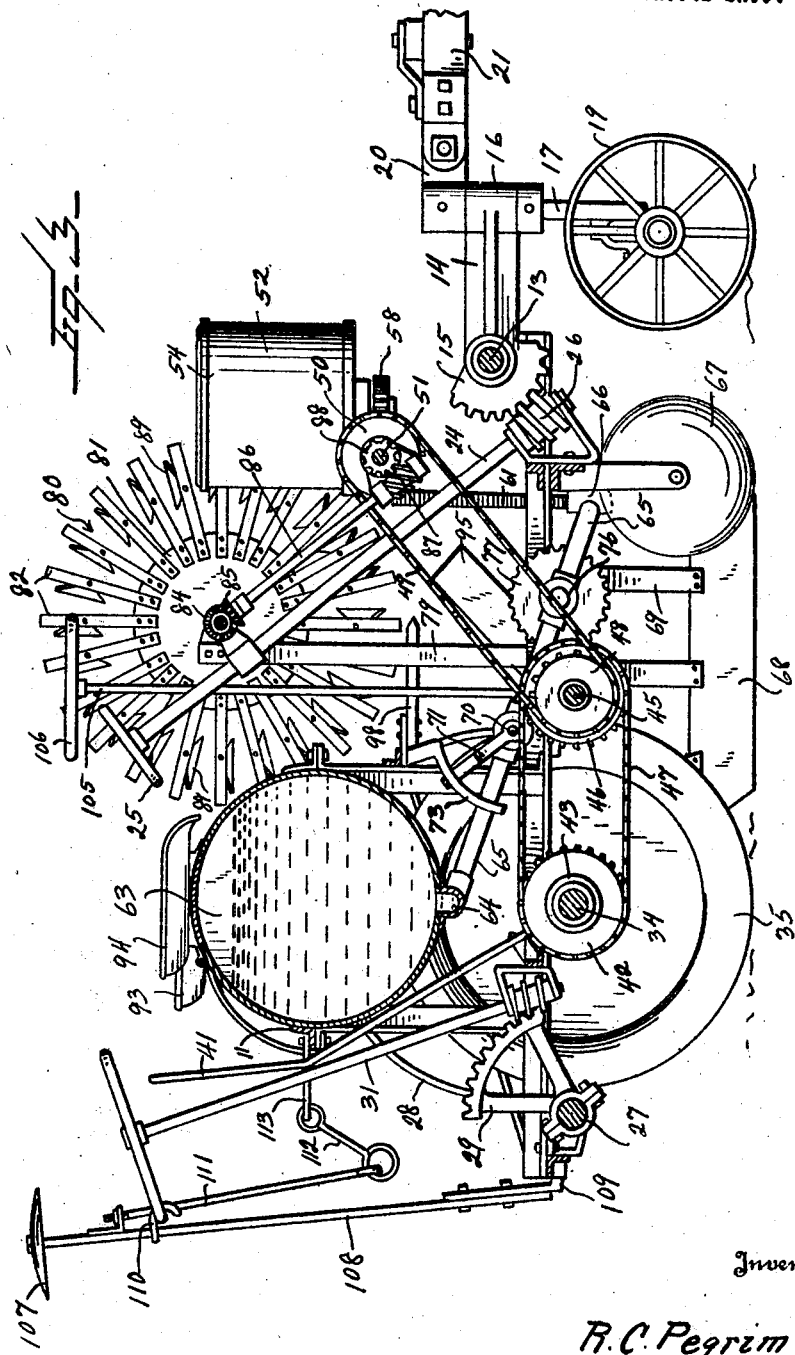

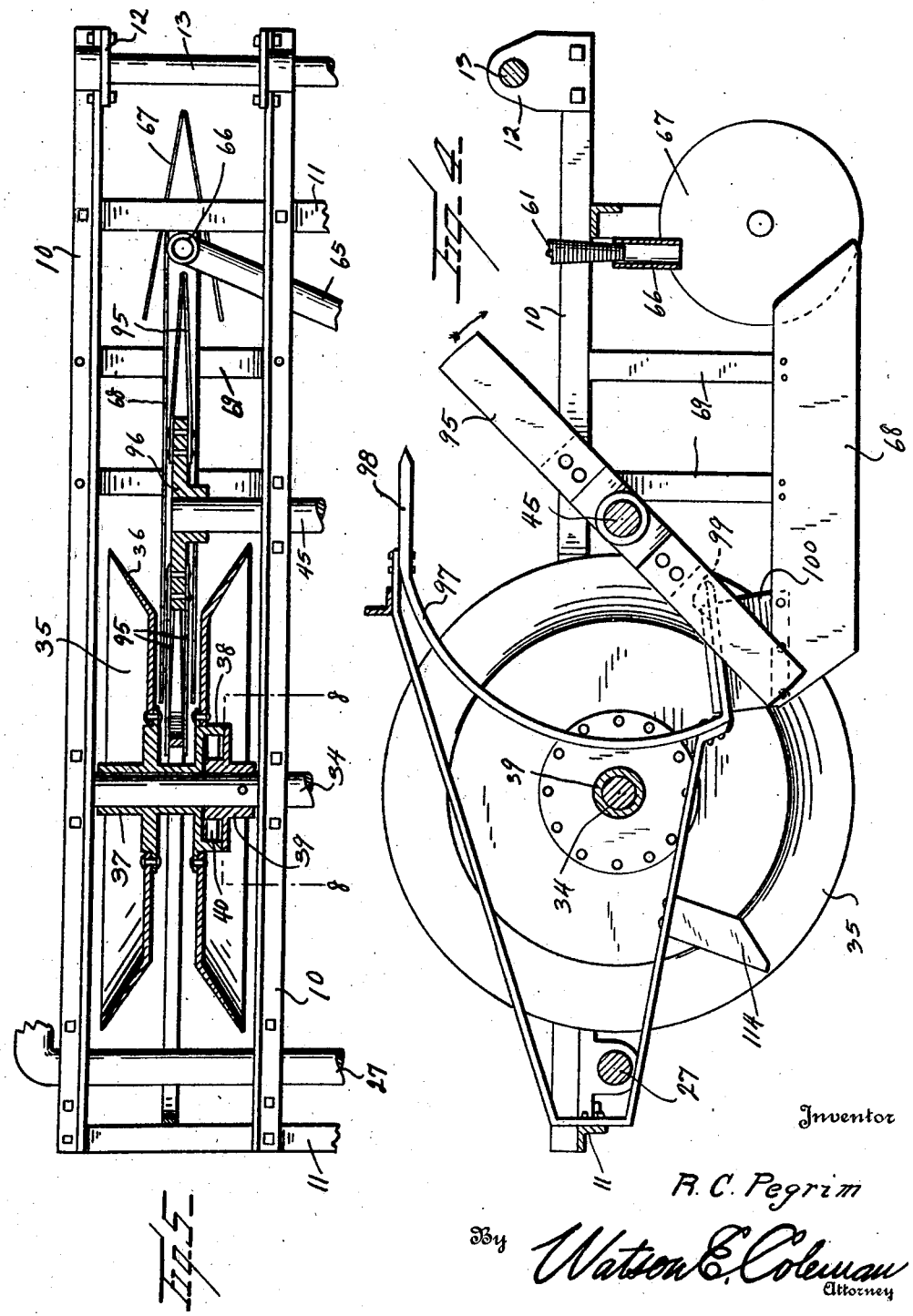

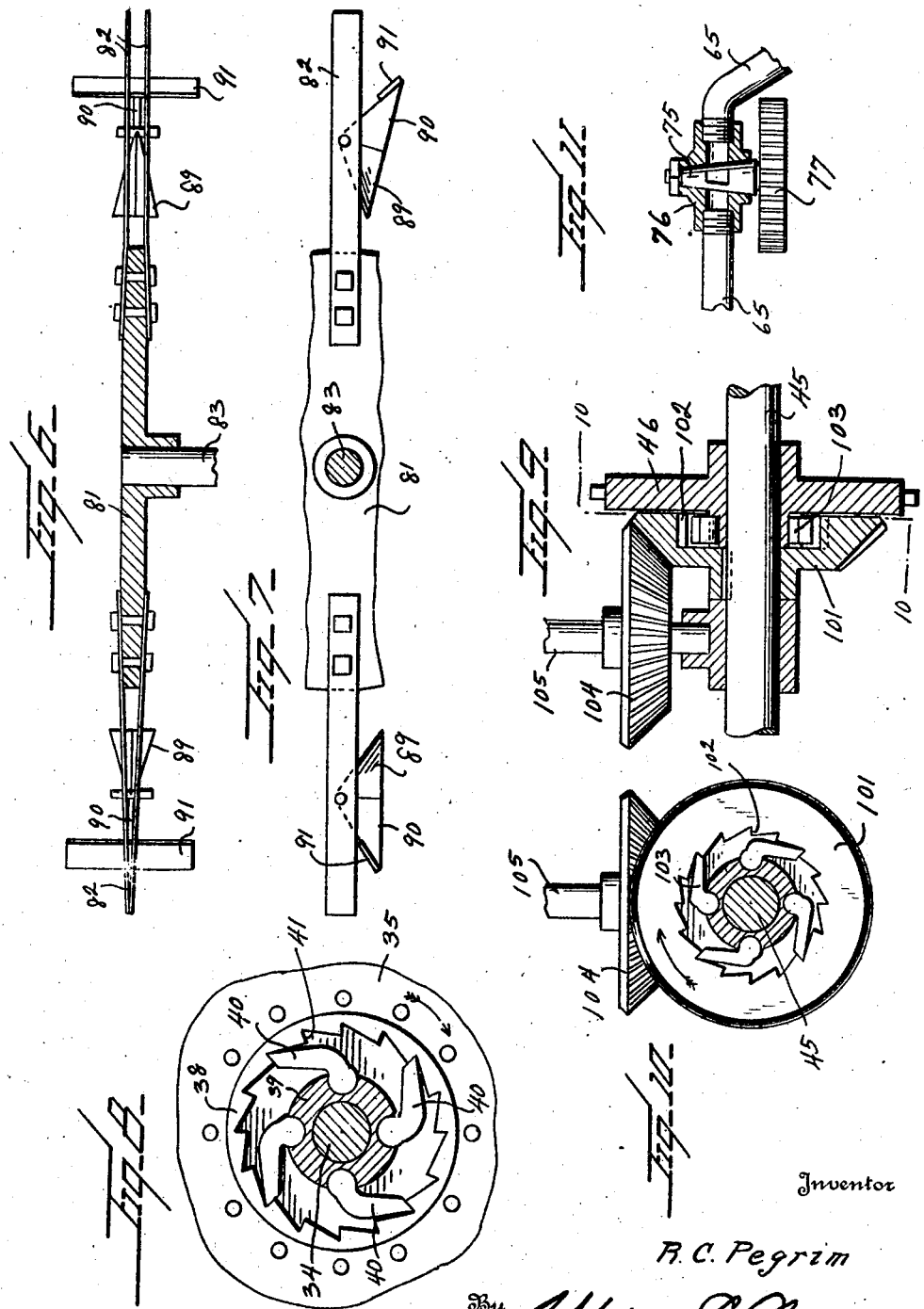

1,523,348

UNITED STATES PATENT OFFICE.

RAYMOND C. PEGRIM, OF NASHVILLE, TENNESSEE.

PLANT-SETTING MACHINE.

Application filed July 29, 1922. Serial No. 578,354.

*To all whom it may concern:*

Be it known that I, RAYMOND C. PEGRIM, a citizen of the United States, residing at Nashville, in the county of Davidson and State of Tennessee, have invented certain new and useful Improvements in Plant-Setting Machines, of which the following is a specification, reference being had to the accompanying drawings.

This invention relates to planting mechanism, and particularly to a machine for setting plants.

The general object of the invention is to provide a machine of this character by which plants may be set at even distances without any check wire to control the setting of the plants.

A further object is to provide a machine of this character which supplies fertilizer to the furrow at the place where the plant is to be set, waters the earth around the setting place, and then sets the plant.

Another object is to provide a mechanism of this character which includes a magazine capable of holding a relatively large number of plants and which may be filled while it is moving and to provide mechanism whereby the plants are taken one by one from the magazine, inserted into a suitable furrow and the roots covered over and pressed down, the mechanism also supplying fertilizer and water to the plant bed.

Still another object is to provide means whereby motion is transmitted to the magazine from the traction wheels of the machine and whereby the rotation of the magazine may be relatively retarded or advanced to thereby set the plants properly at a proper distance apart without the necessity of using any check row wire or like device.

A further object is to provide furrow-opening disks and plant supporting runners between which the plant is adapted to be disposed and whereby it is held upright until the earth on each side of the plant is pressed into place by suitable wheels acting to that end.

A still further object is to provide means whereby the frame of the machine may be relatively raised and lowered to thereby regulate the depth of planting or to provide for transportation of the machine.

Other and minor objects will appear in the course of the following description.

My invention is illustrated in the accompanying drawings, wherein:—

Figure 1 is a side elevation of a plant setting machine constructed in accordance with my invention;

Figure 2 is a top plan view of the construction shown in Figure 1, the elevating controlling shafts and the tops of the fertilizer cans being removed;

Figure 3 is a section on the line 3—3 of Figure 2;

Figure 4 is a section on the line 4—4 of Figure 2;

Figure 5 is a fragmentary top plan view of the supporting frame of the machine, the packing wheels 35 and the hub 96 of the transferring fingers being shown in section;

Figure 6 is a diametrical sectional view of the magazine;

Figure 7 is a fragmentary side elevation of the magazine;

Figure 8 is a fragmentary side elevation of one of the plant pressing and covering wheels, showing the ratchet connection to the shaft thereof;

Figure 9 is a sectional view on the line 9—9 of Figure 2;

Figure 10 is a section on the line 10—10 of Figure 9;

Figure 11 is a sectional view through the water regulating valve;

Figure 12 is a perspective view of the wedge-shaped trigger 89.

Referring to these drawings, and particularly to Figures 1, 2 and 3, it will be seen that the operative parts of the mechanism are mounted upon a main frame consisting of longitudinal beams 10 and transverse frame beams 11, the beams 10 being arranged in two pairs. Attached to the beams 10 are upwardly extending brackets 12, through which passes a shaft 13, and mounted upon this shaft at the middle thereof is a forwardly extending bracket 14 having a sector gear 15 at its rear end, the forward end of the bracket having a vertically extending knuckle 16. Through this knuckle extends the standard 17 which is connected to the axle 18 of a pair of caster wheels 19, and the upper end of this shaft has a forwardly extending member 20 to which the tongue 21 is pivoted by means of the irons 22 and the bolt 23. Thus the tongue may be raised and lowered relative to the member 20, but any shifting of the tongue from right to left will cause the shifting of the caster wheels 19. The tongue is to be provided with the usual draft appliances, singletrees, doubletrees or the like, or the tongue may be connected to any suitable draft hitch whereby the machine may be drawn by a tractor. Of course, if a tractor is used the short tongue is used.

Mounted upon the main frame adjacent the sector gear 15 is an upwardly and rearwardly extending shaft 24 having a hand wheel 25 at its upper end, this shaft at its lower end carrying a screw 36 which is engageable with the sector gear 15.

The rear end of the main frame is supported by a transversely extending axle 27 having angular or cranked ends upon which are mounted the traction wheels 28. This axle 27 has attached to it the sector gear 29 and this sector gear is operated by means of a worm 30 on a hand wheel shaft 31 provided with a hand wheel 32. By rotating the hand wheels 32 and 25, it is possible to depress both the front wheels 19 and the rear traction wheels 28 so as to raise the planting mechanism entirely off the ground or to regulate the depth at which the planting mechanism operates, and it will be obvious that either the front wheel may be depressed and the traction wheels left in their normal position or vice versa. In other words, these supporting wheels are mounted for independent relative vertical adjustment. As illustrated in Figure 1, the rear traction wheels 28 are raised to a position entirely off the ground, but it is to be understood that when the machine is not in use and is being drawn over roads, these rear traction wheels are depressed to a position below the operating parts of the machine and that if it be desired these traction wheels 28 may be depressed so as to regulate the depth of cut.

Mounted upon the main frame in bearings 33 is a transversely extending shaft or axle 34 and this shaft carries upon it, as illustrated in Figure 5, at each end a pair of ground engaging wheels 35. These are dished wheels and have angularly extending or beveled rims 36, the rims of each pair of wheels extending in divergent relation to each other, as illustrated clearly in Figure 5. These wheels are mounted upon a sleeve or hub 37 which is loose upon the shaft 34, but the wheels are operatively connected to the shaft 34 to turn therewith by providing an annulus 38 as part of said sleeve and mounting upon the shaft or axle 34 a collar 39 to rotate with the shaft, this collar having outwardly projecting pawls 40 which engage with the ratchet teeth 41 formed on the inside face of the annulus 38, as illustrated clearly in Figure 8. Thus it pressing wheels 35 (which constitute traction wheels whereby the mechanism is operated) in the direction of the arrow (Figure 8) will rotate the shaft 34.

Loosely mounted upon the shaft 34 is a sprocket wheel 42, and coacting with this sprocket wheel is a clutch member 43 which is fast upon the shaft 34. The wheel 42 is laterally slidable with relation to the clutch member and is provided with coacting clutch teeth, as shown in Figure 2, and this wheel 42 may be shifted out or into engagement with the clutch member 43 by means of a lever 44.

Extending parallel to the shaft 34 is a shaft 45 which carries upon it a sprocket wheel 46 driven from the wheel 42 by means of a chain 47. Also mounted upon the shaft 45 is a sprocket wheel 48 over which passes a chain 49 extending around a sprocket wheel 50 mounted upon a shaft 51. This shaft 51 is mounted upon the main frame but at a height above the shaft 45, as shown in Figure 3, and is the means for operating the fertilizer distributers. Supported on the main frame at the forward end thereof are the two fertilizer containing cans 52 and each can has a discharge opening 53 and a cover 54. Passing through the bottom of each can is a shaft 55 carrying rotatable agitator blades 56, these blades being driven by worms 57 engaging worm wheels 58 on shafts 55. At the lower end of each can, as shown in Figure 1, there is a chute 59 into which the aperture 53 opens, this chute discharging into a circular casing 60, through which the shaft 51 passes. This circular casing has a discharge spout 61 preferably of flexible material and mounted upon the shaft 51 and between each casing 60 is a bladed member, shown as having two diametrically opposite blades 62 which, as they rotate, cause a certain amount of fertilizer to be discharged from the casing 60 into the spout 61.

Mounted upon the rear of the machine and upon the main frame between the wheels 35 is a water tank 63 having a downwardly extending outlet pipe 64 from which, as illustrated in Figure 2, two branch pipes 65 extend and these branch pipes extend divergently downward and outward, then extend parallel to each other, and then again extend downwardly and divergently and enter into a hollow distributer head 66 into which the spout 61 opens, as shown most clearly in Figure 3. By this means water and fertilizer are discharged into the head 66 and thence into the furrow in which the plant is to be set.

Mounted upon the main frame immediately below the heads 66 are the furrow-opening disk wheels 67 which, as shown in Figure 2, are arranged in pairs, each pair converging forwardly. These disk wheels operate to open the furrow into which the plant is to be set and the fertilizer and water are discharged into this furrow after it has been opened and between these furrow disks 67 rearward of the furrow disks 67 and extending parallel to the ground and extending from the furrow disks 67 to the earth pressing wheels 35 are the longitudinally extending plates 68 supported by brackets 69 from the main frame. These plates 68 extend into the space between the furrow openings 67 to a point adjacent the point of discharge of the heads 66 and extend rearward beyond the beveled portion of the wheels 35. These plates 68 act to keep the earth on each side of the furrow from rolling inward on the place where the plant is to be disposed and thus keep the furrow open until the plant has been set and the earth compressed on each side of the furrow. The amount of water which is discharged through the pipe 65 is controlled by means of a valve 70, such as an ordinary rotatable valve, each valve having an arm, the arms being connected, as shown in Figure 2, by a cross bar 72 which operates over an arcuate arm 73, this cross bar 72 being held in adjusted position by means of a set screw 74. It is, of course, necessary to cause the water to be intermittently discharged into the heads 66 and thus onto the ground or into the furrow, and to this end I provide in each pipe 37 a rotatable valve 75 (see Figure 11) operated in a valve casing 76 and provided with a gear wheel 77. This gear wheel 77, as shown in Figure 2, is engaged by a gear wheel 78 on the shaft 45.

Mounted upon a standard 79 or in any other suitable manner is a magazine, which is designated generally 80. This magazine comprises a disk-shaped body or central portion 81 having a plurality of pairs of outwardly radiating spring arms 82 (see Figure 6). This disk-like central member 81 is mounted upon a shaft 83 driven by means of a beveled gear wheel 85 mounted upon the shaft 51. It is to be understood that there are two of these magazines, one on each side of the machine, each coacting with one of the pairs of furrow-opening wheels 67 and with a corresponding pair of furrow-opener plates 68 and discharging the plants between these plates. Both the magazines are alike and, therefore, a description of one suffices for the other.

As before remarked, there are a plurality of radially extending spring fingers 82 attached to each disk 81 and these fingers normally tend to spring inward or toward each other, as shown on the left hand side of Figure 6. In order to provide means for opening these and adjusting the degree to which the fingers will close, I pivotally support between each pair of fingers 82 a wedge-shaped trigger 89 having a shank 90 and a transversely extending handle 91. Each trigger is mounted upon trunnions 92 passing through the spring fingers 82, these trunnions being of sufficient length to permit the fingers 82 to spread apart. When the trigger 89 is downward, as illustrated on the left hand side of Figure 7, the fingers are closed, but when this trigger 89 is forced upward between the fingers, as illustrated on the right hand side of Figure 7, the fingers will be opened to the position on the right hand side of Figure 6. The wedge-shaped members 89 may be used by the operator for the purpose of opening the arms quickly so as to permit the insertion of a plant, and also may be inserted to a greater or less degree between the spring fingers so as to regulate the extent to which the spring fingers will be pressed upon a plant and thus permit the spring fingers to hold plants of larger or smaller growth without a too great compression of the plants in their girth.

The plants are disposed between said spring fingers 82, the stalk of the plant extending longitudinally thereof with the root extending toward the center of the rotatable magazine and the bushy portion of the plant extending outward. Each magazine is disposed adjacent a seat 93, these seats 93 being disposed on each side of a seat 94 on which the driver sits. Mounted upon the shaft 45 below each magazine are two pair of flat, resilient, radially extending arms 95, the pairs of arms extending in diametrically opposite relation from the shaft 45. These arms are urged toward each other by their own resilience, as illustrated in Figure 5. The arms are riveted or otherwise attached to a central hub portion 96 mounted upon the shaft 45. The magazine rotates in the direction of the arrow in Figure 1 and the setting arms 95, as they may be called, rotate in the direction of the arrow (Figures 1 and 4).

Disposed in the path of movement of these arms 95 is an arcuate separator 97 which, for the greater portion of its length, is concentric to the shaft 45 and terminates at its upper end approximately just below the lowest portion of the magazine 80. The extremity of this member 97 is straight, as at 98, and terminates in a point. At its lower end this separator 97 extends forward and slightly upwardly, as at 99, and ends in a wedge-shaped point. Thus when a pair of arms 95 passes off the end of the portion 98 of the separator 97, the arms will spring together, gripping anything which may be placed between them, and as these arms rotate in the direction of the arrow in Figure 4, the point of the portion 99 will enter between the arms and spread them so that the arms will drop anything which they before held. The arms will then continue their upward and forward movement along the arcuate member 97 and be spaced apart until they have again passed the point of member 98. The arms 95 are of such length that they will pass into the space between the furrow plates 68 and deposit the plants, root downward, in the furrow.

Attached to the rear of one of the plates 68 and extending upward to the point or member 98 is a thin steel spring finger 100 which acts to prevent the plants from becoming cramped or tangled between the edge of the point 99 and the ends of the arms 95.

For the purpose of rotating the magazine and advancing or retarding the plant magazine, I drive this magazine as follows: Mounted upon the shaft 83 is a beveled gear wheel 84, as previously stated, engaging with a beveled gear wheel 85 mounted upon a shaft 86. This shaft at its lower end carries a spiral gear 87 which engages with a spiral gear 88 mounted upon the shaft 51. This shaft 51 is driven by the sprocket wheel 50, over which the chain 49 passes from the sprocket wheel 48. This sprocket wheel 48 is mounted upon the shaft 45 which is driven by the sprocket wheel 46 over which the chain 47 passes. This sprocket wheel 46, however, as illustrated in Figure 9, is loose upon the shaft 45, but fast upon the shaft 45 is a beveled gear wheel 101 having interior ratchet teeth 102. The hub of the wheel 46 has pawls 103 adapted to engage with the ratchet teeth 102 upon a rotation of the wheel 46 is a clockwise direction. This beveled gear wheel 101 engages with a beveled gear wheel 104 on a vertical shaft 105 carrying a hand wheel 106 at its upper end. Under ordinary circumstances, the sprocket wheel 46 transmits its motion by means of the pawls 103 to the beveled gear wheel 101 and to the shaft 45, which in turn transmits its motion by the means heretofore explained to the agitator blades of the fertilizer cans, to the fertilizer distributer blades 62, to the valves 75, and to the magazine, but if it be desired to shift the magazine forward faster than it is ordinarily operated so as to advance the point of discharge of a plant or advance the position of setting the plant so that the plant will align properly with the row of plants being set, then the hand wheel 106 is operated faster than the speed of rotation of the sprocket wheel 46 which, of course, operates the shaft 45 and thus operates all of the fertilizer distributing, valve operating and magazine operating devices more rapidly than they otherwise would, or in other words, advances them. If, on the other hand, it be desired to retard the operation of setting the plant, this is accomplished by retracting the hub of the gear 42 from engagement with the clutch 43, whereupon the plant setting devices are all put out of operation until the sprocket wheel 42 is again shifted into engagement with the clutch. Of course, it is obvious that the hand wheel 106 might be operated with the machine stationary so as to set the first plant of the series in alignment with the transverse rows of plants being set and that thereafter the machine will operate to set a plant every so far apart.

Preferably the rear end of the supporting frame carries, as illustrated in Figures 1 and 3, a row marking disk 107 of conventional form mounted upon a rod 108 which at its lower end is pivotally and adjustably connected to the frame, as at 109, and which may be shifted either to the right or to the left so that while the machine is traveling along two rows and setting plants therein a place for a third row may be marked. This row marker is ordinarily supported in a vertical position by means of a hook 110 engaging the hand wheel of shaft 31. The marker is braced by means of a rod 111 and a link 112 which is connected to a bracket 113 projecting from the main frame. Inasmuch as this is a conventional marker and its operation will be fully understood, the general operation of this mechanism is as follows: It is intended that the driver of the machine shall use the seat 94 while two feeders, one for each magazine, are seated on the seats 93 behind each magazine. It is intended that the magazine shall be initially filled with plants and that the feeder shall have a receptacle from which he may from time to time replenish the magazine or insert the plants between the resilient fingers 82 as the fingers come opposite or are in other convenient relation. As the machine advances over the field, the magazine rotates in a clockwise direction, carrying the plants downward, and as each plant reaches a position just in advance of the forwardly extending pointed end 98 of the spacer 97 the spring arms 95, which are stronger and broader than the fingers 82, will move off the spacer and close upon the plant, drawing the plant from between the fingers 82, carrying the plant downward into the space between the plates 68 and with its root in the furrow. At the point where the plant is to be set, a certain amount of fertilizer and a certain amount of water have already been deposited so as to have the ground in proper condition to receive the plant. This is secured by a proper timing of the fertilizer distributer 62 and of the valve 75. As the plant reaches this spot, the arms 95 are forced open by engaging the wedge 99 and the plant is dropped, the finger 100 preventing the plant from becoming entangled between the arms and the member 99. The two arms are spread apart by the spreader 97 and again carried around ready to receive a new plant.

If it be desired to advance the point of setting the plant, this is done, as before remarked, by turning the hand wheel 106. If it is desired to retard the setting of the plant this is accomplished by momentarily shifting the sprocket wheel 42 out of engagement with the clutch member 43. The furrow-opening disks 67, of course, form a furrow in the earth immediately in advance of the plant and the furrow-closing wheels 35 force the earth inward around the plant and compress it so as to set the plant firmly in place. The depth to which the plant may be set and the depth to which the furrow may be opened may be regulated by adjusting the forward wheels 19 relative to the frame by means of the sector 15 and worm 26, and the same may be accomplished by raising or lowering the rear traction wheels 28 by means of the shaft 31 operating the sector 29.

The machine can be built with as large a magazine as desired, but the intention is to have the magazine filled with plants before starting and then the feeder can have leisure to pick up plants and place them between the fingers 82 without stopping the machine or skipping a hill. By providing means for advancing or retarding the setting of the plants, it is possible to time and check the setting of plants without the use of check row wires. The parts of the earth-compressing wheels 35 are cleaned of dirt which may adhere thereto by means of scrapers 114, which not only cleanse the parts of the wheels of dirt but prevent picking up of the ridge formed in the dirt by the beveled treads of these wheels. It is obvious that by changing the ratios of the driving gears that the distance between plants may be readily changed according to the character of the plants being set, and it is within the contemplation of this invention to make such changes in the ratios of the gearings as will accomplish the desired end. Obviously many changes might be made in the details of construction and arrangement of parts without departing from the spirit of the invention.

I claim:—

1. In a plant setting machine, a rotatable magazine mounted thereon and having a plurality of pairs of radiating spring fingers between which the plants are adapted to be resiliently gripped, means for constantly rotating the magazine in one direction, and means for manually and adjustably separating the fingers from each other comprising members wedge-shaped in cross section and mounted upon the fingers so that they may be inserted between the fingers to thereby force the fingers apart.

2. A plant setting machine including a supporting frame, a rotatable plant magazine, ground engaging traction wheels, means operated by the traction wheels for rotating the plant magazine, means operated by the traction wheels for depositing water and fertilizer at spaced distances on the ground, means operated by said traction wheels for withdrawing the plants from the magazine as each plant reaches a predetermined point in its path of movement and setting them in the ground at the places where the water and fertilizer are deposited, and manually controllable means for advancing the instant of depositing water and fertilizer and the instant of depositing the plants or retarding the same with relation to the traction wheels.

3. In a plant setting machine, a supporting frame, a rotatable magazine mounted thereon and having a plurality of pairs of radiating spring fingers between which the plants are adapted to be resiliently gripped, means for withdrawing the plants from the magazine and depositing them in the ground at spaced intervals comprising a rotatable member having a plurality of radially disposed pairs of relatively wide spring arms, the path of movement of the ends of said arms being in the same plane as and at one point adjacent to the path of movement of the ends of said fingers, and means for holding said arms apart while they are moving upward from the ground to a position adjacent the path of movement of the ends of said fingers, said means then permitting said spring arms to close upon the plant to thereby withdraw the plant from the magazine and then acting to open said spring arms as they reach a position adjacent the ground to thereby cause the deposit of the plants.

4. A plant setting machine including a supporting frame, a pair of furrow openers mounted at the forward end of the supporting frame, a pair of guide plates having their forward ends disposed between the furrow openers and extending rearwardly therefrom, a pair of furrow-closing traction wheels mounted upon the supporting frame immediately rearward of the plates, a shaft upon which said traction wheels are loosely mounted, a magazine mounted upon the frame and including a shaft, radially disposed pairs of plant engaging fingers, means for withdrawing the plants from the magazine and depositing said plants in the space between the rear ends of said plates comprising a rotatable member having radially extending pairs of spring arms wider than said fingers, means for holding said arms spread apart until they arrive at a position adjacent one of said pairs of fingers and then permitting said arms to close to withdraw a plant from between the fingers, means transmitting motion from the shaft of the traction wheels to the shaft upon which the spring arms are mounted, means for transmitting motion from the last named shaft to the shaft upon which the magazine is mounted, manually operable means for rotating the arm carrying shaft and the magazine shaft at a higher speed than their normal driven speed, and manually operable means for disconnecting the magazine shaft and the arm carrying shaft from the traction wheels.

In testimony whereof I hereunto affix my signature.

RAYMOND C. PEGRIM.